United States Patent

Kawakami et al.

[11] Patent Number: 5,835,317
[45] Date of Patent: Nov. 10, 1998

[54] CLEANING DEVICE FOR MAGNETIC TAPE RECORDING AND/OR REPRODUCING APPARATUS

[75] Inventors: Kenji Kawakami, Kanagawa; Masao Ohyama, Tokyo, both of Japan

[73] Assignee: Sony Corporation, Tokyo, Japan

[21] Appl. No.: 765,439

[22] PCT Filed: May 20, 1996

[86] PCT No.: PCT/JP96/01332

§ 371 Date: Jan. 16, 1997

§ 102(e) Date: Jan. 16, 1997

[87] PCT Pub. No.: WO96/36962

PCT Pub. Date: Nov. 21, 1996

[30] Foreign Application Priority Data

May 19, 1995 [JP] Japan ................................. 7-121942

[51] Int. Cl.⁶ .................................................. G11B 5/127
[52] U.S. Cl. ................................................... 360/128
[58] Field of Search ............................................ 360/128

[56] References Cited

U.S. PATENT DOCUMENTS

| | | | |
|---|---|---|---|
| 3,931,643 | 1/1976 | Kuroe | 360/128 |
| 4,704,647 | 11/1987 | Hino | 360/128 |
| 5,170,304 | 12/1992 | Katohno et al. | 360/128 |
| 5,182,691 | 1/1993 | Mimasu et al. | 360/128 |
| 5,335,128 | 8/1994 | Morikana | 360/128 |
| 5,453,894 | 9/1995 | Kim et al. | 360/128 |
| 5,469,318 | 11/1995 | Inoue et al. | 360/128 |
| 5,523,913 | 6/1996 | Kim | 360/128 |
| 5,602,705 | 2/1997 | Nouchi et al. | 360/128 |
| 5,710,684 | 1/1998 | Inoue et al. | 360/128 |

*Primary Examiner*—Allen T. Cao
*Attorney, Agent, or Firm*—Jay H. Maioli

[57] ABSTRACT

A cleaning device for a recording and/or reproducing apparatus including a rotary head device having a drum carrying a magnetic head, with a magnetic tape being used as a recording medium. The cleaning device includes a cleaning member abutted against the magnetic head of the rotary head device for cleaning the magnetic head and an actuating mechanism for causing the cleaning member to be abutted against the magnetic head in the rotating state of the rotary head device. The actuating mechanism causes the cleaning member to be abutted against the magnetic head in the rotating state of the rotary drum prior to the loading of the magnetic tape on the rotary head device by the tape loading mechanism, and releases abutment of the cleaning member against the magnetic head when loading the magnetic tape by the tape loading mechanism on the rotary head device. The magnetic head is cleaned each time the magnetic tape is loaded.

8 Claims, 10 Drawing Sheets

5,835,317

CLEANING DEVICE FOR MAGNETIC TAPE RECORDING AND/OR REPRODUCING APPARATUS

TECHNICAL FIELD

This invention relates to a cleaning device for a recording and/or reproducing apparatus employing a magnetic tape as a recording medium. More particularly, it relates to a device for cleaning a magnetic head mounted on a rotary drum about which is placed a magnetic tape and which constitutes a rotary head unit.

BACKGROUND ART

Heretofore, a recording and/or reproducing apparatus, employing a magnetic tape as a recording medium, and configured for recording and/or reproducing information signals by a rotary head device having a rotary drum in turn carrying a magnetic head, is in widespread use.

In the present recording and/or reproducing apparatus, employing the rotary head, a magnetic tape is placed obliquely around the rotary drum carrying the magnetic head of the rotary head device and is run while running the magnetic head in rotation for establishing relative sliding contact between the magnetic tape and the magnetic head for recording and/or reproducing information signals. At this time, the information signals are recorded on a recording track obliquely formed relative to the longitudinal direction of the magnetic tape.

In this sort of the recording and/or reproducing apparatus, since the magnetic head is perpetually in sliding contact with the magnetic head during recording and/or reproduction of information signals, magnetic powder debris or dust and dirt peeled off from the magnetic tape becomes deposited on the magnetic head if recording and/or reproduction is continued for prolonged time. If the magnetic powders or dust and dirt become affixed to the magnetic head, recording and/or reproducing characteristics for information signals are deteriorated. For preventing such deterioration in the recording and/or reproducing characteristics, it is necessary to clean the magnetic head periodically.

Thus, the recording and/or reproducing apparatus employing the rotary head unit is provided with a cleaning unit for cleaning the magnetic head. This cleaning unit is constructed and designed so that the magnetic head mounted on the rotary drum may be cleaned by bringing a cleaning member into sliding contact with the outer peripheral surface of the rotary drum carrying the magnetic head of the rotary head unit.

DISCLOSURE OF THE INVENTION

It is an object of the present invention to provide a cleaning device for a recording and/or reproducing apparatus employing a magnetic tape as a recording medium whereby a magnetic head of a rotary head unit can be cleaned easily and reliably.

It is another object of the present invention to provide a cleaning device capable of performing cleaning while assuring protection of the magnetic head of the rotary head unit.

It is another object of the present invention to provide a cleaning device which is durable and which enables reliable cleaning over an extended period of time.

A cleaning device for a recording and/or reproducing apparatus for a magnetic tape, proposed for accomplishing the above objects, includes a rotary head device having a rotary drum carrying a magnetic head, a cleaning member for being abutted against at least the magnetic head of the magnetic head device for cleaning the magnetic head, and actuating means for causing at least the cleaning member to be abutted against at least the magnetic head in the rotating state of the rotary head device.

The cleaning device according to the present invention includes a tape loading mechanism for loading the magnetic tape on the rotary head device. The actuating mechanism for causing the cleaning member of the cleaning device to be abutted against the magnetic head causes the cleaning member to be abutted at least against the magnetic head in the rotating state of the rotary drum prior to the loading of the magnetic tape on the rotary head device by at least the tape loading mechanism.

The actuating mechanism for causing the cleaning member to be abutted against the magnetic head releases abutment of the cleaning member against the magnetic head when the magnetic tape is loaded by the tape loading mechanism on the rotary head device.

The actuating mechanism for causing the member to be abutted against the magnetic head includes a supporting member carrying the cleaning member and moved between a position in which the cleaning member is abutted against the magnetic head and a position in which the cleaning member is spaced apart from the magnetic head, and biasing means for biasing the supporting member in a direction in which the cleaning member is abutted against the magnetic head.

Other objects and advantages of the present invention will become apparent from the following description of preferred embodiments which is made in conjunction with accompanying drawings.

BEST MODE FOR CARRYING OUT THE INVENTION

A recording/reproducing apparatus employing, as a recording medium, a magnetic tape to which the cleaning device according to the present invention is applied, is hereinafter explained.

Figure 1:
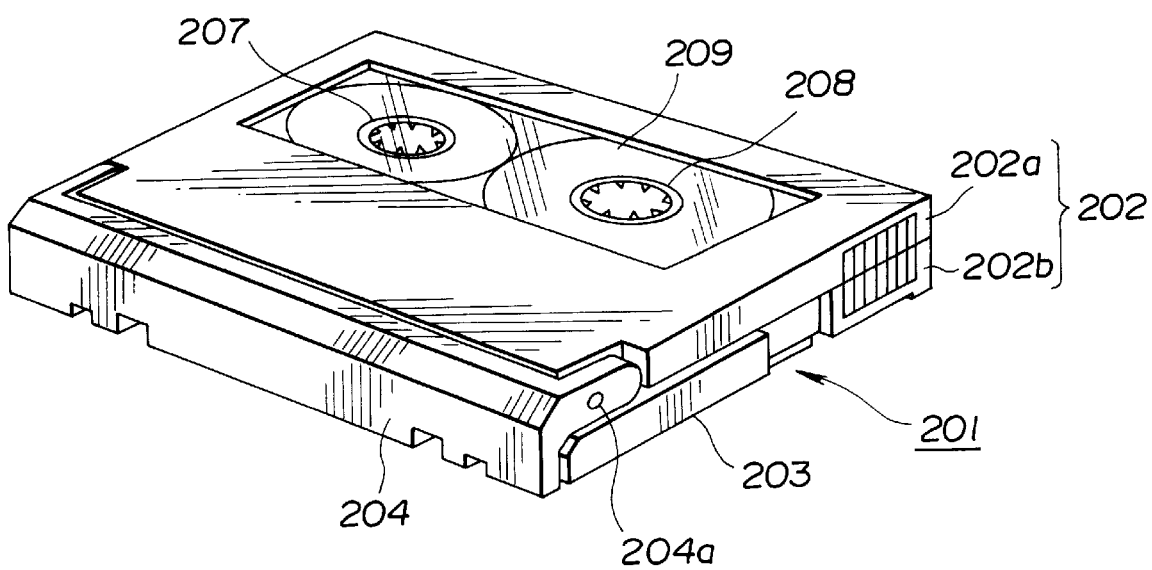
FIG. 1 is a perspective view showing a type of cassette employed as a magnetic tape in a recording and/or reproducing apparatus to which the cleaning device according to the present invention is applied.
Figure 2:
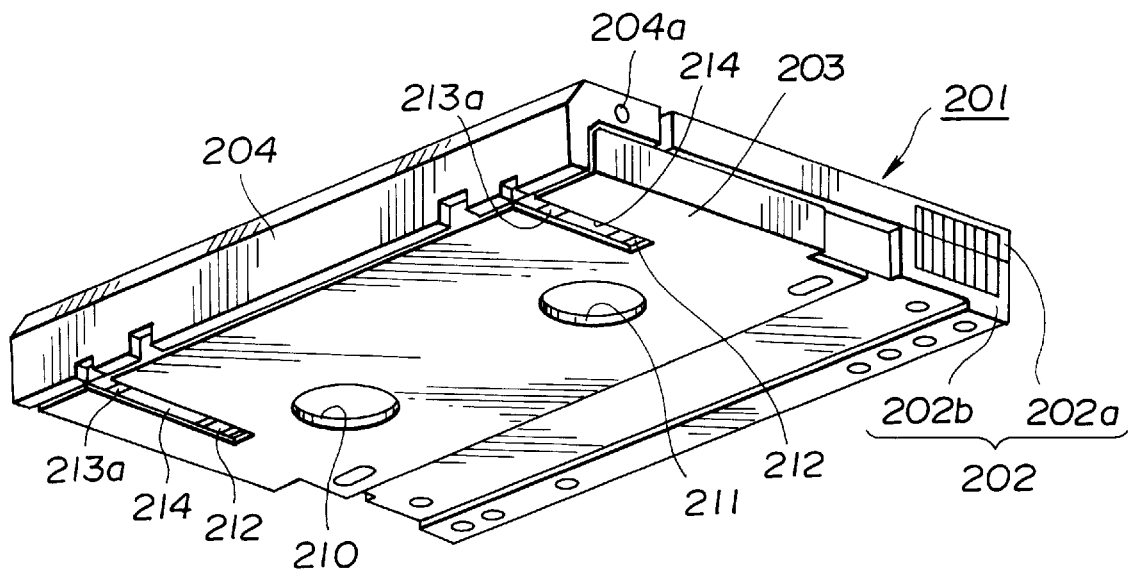
FIG. 2 is a perspective view showing the bottom side of the tape cassette.
Figure 3:
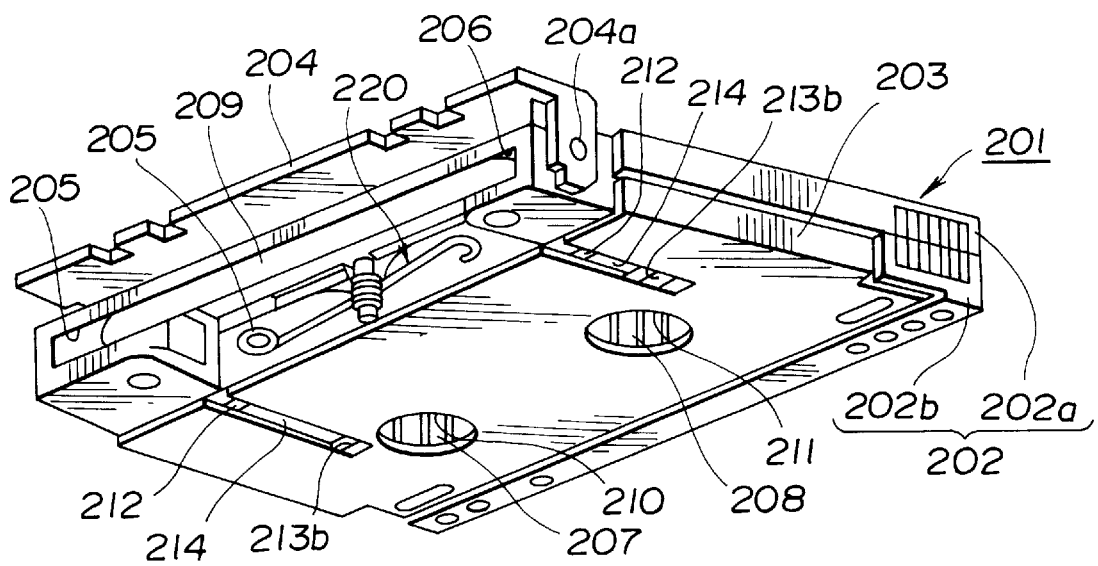
FIG. 3 is a perspective view showing the state in which a lid of the tape cassette is opened.

The present recording/reproducing apparatus employs, as a recording medium, a tape cassette having a magnetic tape housed within cassette halves making up a main cassette portion. This type cassette 201 is made up of a main cassette portion 202 formed by abutting and combining an upper half 202a and a lower half 202b and a pair of tape reels 207, 208, carrying a magnetic tape 209, rotatably mounted therein, as shown in FIGS. 1 to 3. The magnetic tape 209, placed around the tape reels 207, 208, is drawn out for extending around the front side of the cassette main portion 202 via tape draw-out openings 205, 206 provided on both sides of the front side of the cassette main portion 202, as shown in FIG. 3. On the front side of the cassette main portion 202, there is mounted a lid 204 overlying the magnetic tape 209 extended on the front side of the main cassette portion 202. This lid 204 is supported for rotation on the main cassette portion 202 by pivots 204a on opposite sides thereof on both sides of the main cassette portion 202, so that, when the tape cassette 201 is loaded on the recording/reproducing apparatus, the magnetic tape 209 extended along the front side of the main cassette portion 202 is exposed the outside. The lid 204 is perpetually biased into rotation in a direction indicated by arrow B in FIG. 3 for overlying the front side of the tape cassette 202 via biasing means, not shown.

On the bottom side of the main cassette portion 202 are formed a pair of reel shaft inserting openings into which are disposed hubs provided at mid portions of the tape reels 207, 208. On the bottom surface of the main cassette portion 202 is mounted a cover plate 203 adapted for opening and closing the reel-shaft inserting openings. In the cover plate 203 are formed apertures 210, 211 in register with the reel shaft inserting openings formed in the main cassette portion 202. The cover plate 203 is adapted for being moved relative to the main cassette portion 202. When the cover plate 203 is not in use, that is when the tape cassette 201 is not loaded on the recording/reproducing apparatus, the cover plate is biased towards the front side of the main cassette portion 202 by a torsion coil spring 205 provided on the front side of the main cassette portion 202 and is thereby moved to a position of closing the reel shaft inserting openings, as shown in FIG. 2. When the cover plate 203 has been moved to a position of closing the reel shaft inserting openings and to a position of opening the reel-shaft inserting openings, the cover plate 203 is held in these positions by lock pawls 212 on the main cassette portion 202 being engaged with engagement openings 213a, 213b, respectively. These engagement openings 213a, 213b are formed in unlock member intrusion grooves 214 into which are intruded unlock members provided on the recording/reproducing apparatus when the tape cassette 201 is loaded on the recording/reproducing apparatus. That is, when the tape cassette 201 is loaded on or unloaded from the recording/reproducing apparatus, the unlock member provided on the recording/reproducing apparatus is intruded into the unlock member intrusion grooves 214 for elastically displacing the lock pawls 212 for unlocking the cover plate 203 so that the cover plate is movable in the directions of opening and closing the reel shaft inserting openings.

Figure 4:
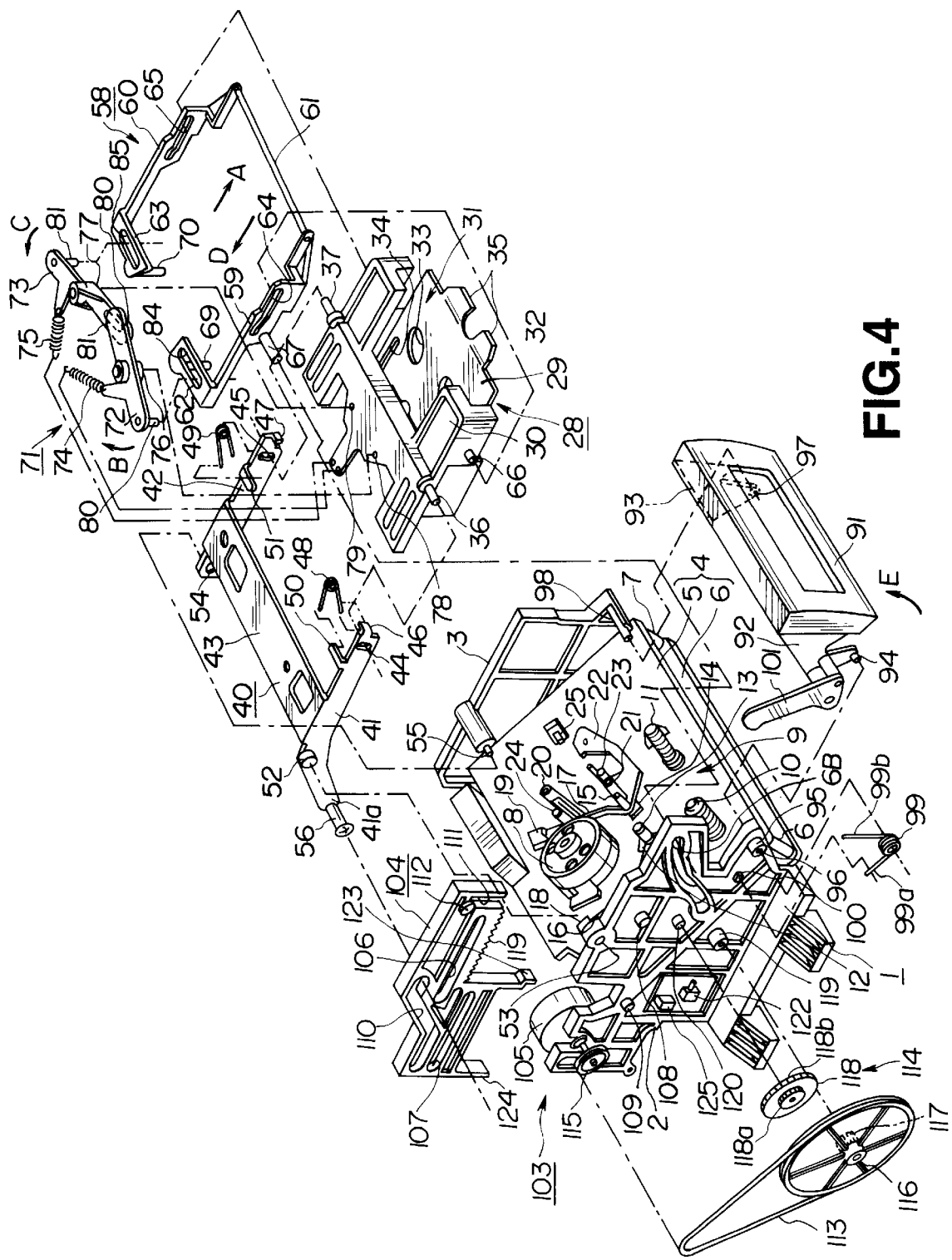
FIG. 4 is an exploded perspective view showing a recording/reproducing apparatus in an ejection state for loading and unloading a cassette.

In the recording/reproducing apparatus, employing the tape cassette 201 as a recording medium, as described above, a supporting substrate 4 is supported between a pair of side plates 2, 3 provided on both lateral sides of a base block 1, as shown in FIG. 4. This supporting substrate 4 is arranged so that first and second planar supporting base plates 5, 6 are disposed parallel to each other and so that respective corners of the supporting base plates 5, 6 are connected to each other by connecting members 7. The supporting substrate 4 is supported at an inclined angle of approximately 20 degrees relative to the base block 1.

In the upper surface of the supporting substrate 4 is mounted a rotary head unit 8 having a rotary drum carrying a magnetic head, as shown in FIG. 4. The rotary head unit 8 is arranged at the center of the upper side of the supporting substrate 4, as shown in FIG. 4. The rotary drum of the rotary head unit 8 is run in rotation by a driving motor arranged between the first and second supporting base plates 5 and 6.

The upper and lower regions of the supporting substrate 4 facing the rotary head unit 8 are designed as a cassette loading unit 9 on which the tape cassette 201 is loaded. The cassette loading unit 9 is provided with a pair of reel driving shafts 10, 11 engaged with tape reels 207, 208 of the tape cassette 201 loaded on the loading unit 9 for running the tape reels 207, 208 in rotation. These reel driving shafts 10, 11 are run in rotation by a reel driving motor arranged between the first and second supporting base plates 5, 6.

On the supporting substrate 4, there is mounted a pair of movement guide blocks 12, 13 making up a loading mechanism for pulling out the magnetic tape 209 housed within the tape cassette 201 loaded on the cassette loading unit 9 to a pre-set tape running path for placing the tape around the outer peripheral surface of the rotary head unit 8. On these movement guide blocks 12, 13, tape guides 14, 15 are set upright. These movement guide blocks 12, 13 are moved from the cassette loading unit 9 towards the rotary head unit 8 by being guided by movement guide grooves 16, 17 for pulling out the magnetic tape 209 from the tape cassette 201 loaded on the cassette loading unit 9 for placement on the rotary head unit 8.

When moved to a position of lacing the magnetic tape 209 around the rotary head device 8, the movement guide blocks 12, 13 are caused to bear against positioning blocks 18, 19 provided on the supporting substrate 4 so as to be set at a position in which the magnetic tape 209 is placed around the rotary head device 8.

On the supporting base 4 are mounted a capstan 20 and a pinch roll 21 for causing the magnetic tape 209 placed around the rotary head unit 8 to run at a constant speed. The capstan 20 is run in rotation by a capstan driving motor mounted upright on the first supporting substrate 5 between the first and second supporting base plates 4, 5. The pinch roll 21 is set upright on the distal end of the rotary arm 22 rotatably supported on the first supporting base plate 4 and is brought into or out of contact with the capstan 20 by rotation of the rotary arm 22. By the pinch roll 21 being pressure-contacted with the capstan 20, the magnetic tape 209 is clamped between the pinch roll 21 and the capstan 20 and caused to run at a constant speed.

On the supporting substrate 4 is mounted a movement tape guide 23 for pulling out the magnetic tape 209 out of the tape cassette 201 for moving it towards the capstan 20. In proximity to the capstan 20, a fixed tape guide 24 is provided for controlling the running position of the magnetic tape 209 relative to the capstan 20.

On the supporting substrate 4, there is mounted a lid opening member 25 which, when the tape cassette 201 is loaded in the cassette loading unit 9, turns the lid 204 against the bias of biasing means for opening the front side of the main cassette portion 202 for exposing the magnetic tape 209 to outside, as shown in FIG. 4.

On the supporting substrate 4, there is mounted a cassette holder 28 for holding the tape cassette 201 loaded on the cassette loading unit 9 for loading or unloading the tape cassette 201 with respect to the cassette loading unit 9. This cassette holder 28 is made up of a cassette supporting plate 29 for loading the tape cassette 201 thereon and a cassette holding frame 30 for holding the tape cassette 201 supported on the cassette supporting plate 29. That is, the cassette holder 28 is formed by abutting and connecting the cassette holding frame 30 to the cassette supporting plate 29. The tape cassette 201 is loaded or unloaded with respect to the cassette holder 28 via a front side aperture 31. The tape cassette 201 is inserted into the cassette holder 28 via its front side carrying the lid 204 as an inserting end.

The bottom plate 29 of the cassette holder 29 is formed with inserting openings 33, 34 into which are introduced the reel driving shafts 10, 11 adapted for being engaged with hubs of the tape reels 207, 208 of the tape cassette 201 loaded on the cassette holder 28. On both lateral sides of the bottom plate 29 are protuberantly formed unlock members 34 adapted for engaging with unlock member intruding grooves 214, 241 formed in the tape cassette 201 for shifting the lock pawls 212 out of engagement with the engagement openings 213a, 213b. On the bottom plate 29, towards the aperture 31, there is protuberantly formed an insertion guide piece 35 for guiding the insertion of the tape cassette 201 being introduced into the cassette holder 28.

The cassette holder 28 is arranged on the cassette loading unit 9 via a holder supporting frame 40 rotatably supported between a pair of side plates 2, 3 of the base block 1. The holder supporting frame 40 is made up of first and second rotary arms 41, 42 mounted parallel to each other and a connecting plate 43 interconnecting these arms 41, 42, as shown in FIG. 4. The cassette holder 28 is supported on the holder supporting frame 40 for rotation about the supporting shafts 36, 37 as the center of rotation by introducing pivot shafts 36, 37 formed on both opposing lateral wall sections of the cassette holding frame 29 into through-holes 44, 45 bored in the distal sides of first and second rotary arms 41, 42 of the holder supporting frame 40.

The through-holes 44, 45 in the holder supporting frame 40, into which are passed supporting shafts 36, 37 of the cassette holder 28, are formed as elongated holes having the direction of width of the first and second rotary arms 41, 42 normal to the longitudinal tape running direction as the long axes. The distal ends of the first and second rotary arms 41, 42 are formed with spring attachment portions 46, 47 by warping. A pair of torsion springs 48, 49 are mounted by these spring attachment portions 46, 47. These torsion coil springs 48, 49 have one arm sections thereof retained by retainers 50, 51 protuberantly formed on the first and second rotary arms 41, 42, while having the other arm sections thrust against the pivot shafts 36, 37 of the cassette holder 28 for pressuring these pivots 36, 37 against the lower ends of the through-holes 44, 45 formed as elongated openings.

The holder supporting frame 40, rotatably supporting the cassette holder 28, is supported by the base block 1 by introducing a pivot 52 provided on the outer lateral side of the proximal portion of the first rotary arm 41 in a reel shaft introducing opening 53 formed in the upper end of the second rotary arm 2 and by introducing a pivot 55 set upright on the inner lateral surface of the other lateral side plate 3 of the base block 1 into a reel shaft introducing opening 54 formed in the proximal end of the second rotary arm 42. The holder supporting frame 40 is supported by the base block 1 for rotation with the pivots 52, 55 as the center of rotation. A rotary arm 41a is extended from the proximal end of the first rotary arm 41. On the outer lateral surface of the rotary arm 41a is protuberantly formed a first engagement pin 56 engaged in a first cam groove formed in a movement actuation plate configured for rotating the holder supporting frame 40 as later explained. The first engagement point 56 is protruded towards the lateral side of the first side plate 2 via a cut-out 57 formed in the first side plate 2.

The cassette holder 28 is provided with a thrusting supporting mechanism 58 for thrusting and supporting the tape cassette 201 loaded on the cassette holder 28 to a pre-set constant position and for causing relative movement of the cassette main portion 202 with respect to the cover plate 203 for opening the reel shaft introducing opening formed on the cassette main portion. This thrusting supporting mechanism includes first and second movement levers 59, 60 for being moved along both lateral sides of the cassette holder 28 and a connecting shaft 61 interconnecting the foremost parts of the first and second movement levers 59, 60. This connecting shaft 61 includes a thrusting actuating member for thrusting the back side of the cassette main portion 202 of the tape cassette 201 loaded on the cassette holder 28 for causing relative movement between the cassette main portion 202 and the cover plate 203 for opening the reel-shaft inserting opening.

The proximal end of the first and second movement levers 59, 60 are provided with first and second supporting pieces 62, 63 extending in mutually opposite directions and first and second inclined cam grooves 64, 65 are formed in a mid portion of the movement levers for extending along the longitudinal direction of the magnetic tape. The first and second movement levers 59, 60 are extended along both lateral sides of the cassette holder 28 and are mounted on the cassette holder 28 with an engagement pin 66 protuberantly formed on the lateral sides of the cassette holder 28 being engaged with the first and second inclined cam grooves 64, 65 and with the first and second supporting pieces 62, 63 being set on the upper surface of the cassette holder 28. At this time, the connecting shaft 61 is extended to a position of thrusting the back side of the tape cassette 201, opposite to its inserting end, loaded on the cassette holder 28. The first and second movement levers 59, 60, interconnected by the connecting shaft 61, are moved relative to the cassette holder 28 within the extent of the first and second inclined grooves 64, 65.

An engagement pin 67 is protuberantly formed on the outer lateral surface of a mid portion of the first movement lever 59. This engagement pin 67 is engaged in a second cam groove 68 formed in the side plate 2 of the base block 1 and also with a vertical guide groove provided on a movement actuation plate of a holder movement actuation mechanism as later explained.

The first and second supporting pieces 62, 63 are provided with cassette thrusting pins 69, 70 protruded into the inside of the cassette holder 28. When the first and second movement levers 59, 60 are moved relative to the cassette holder 28 in a direction as indicated by arrow A in FIG. 4, the cassette thrusting pins 69, 70 thrust the tape cassette 28 loaded on the cassette holder 28 for ejecting the tape cassette out of the cassette holder 28.

The cassette holder 28 is also provided with a thrusting biasing mechanism 71 for shifting the first and second movement levers 59, 60 by the connecting shaft 61 under spring bias for thrusting the tape cassette 201 loaded on the cassette holder 28. This thrusting biasing mechanism 71 has first and second rotary levers 72, 73 and first and second tension springs 74, 75 for rotationally biasing the levers 72, 73. The first and second rotary levers 72, 73 have pivot shafts 76, 77 provided at mid portions thereof supported within supporting openings 78, 79 formed in the upper surface of the cassette holder 28 and are mounted for rotation about these pivot shafts as the center of rotation. The first and second rotary levers 72, 73 are rotated in timed relation to each other by having engagement pins 80 on one sides thereof engaged in engagement openings 81. The engagement openings 81 are formed as elongated openings. On the opposite ends of the first and second rotary levers 72, 73 are set depending engagement pins 82, 83, respectively. These engagement pins 82, 83 are engaged in engagement openings 84, 85 formed as elongated openings in the first and second movement levers 59, 60, respectively. The tension springs 74, 75 are mounted under tension between the first and second rotary levers 72, 73 and the cassette holder 28, respectively, for rotationally biasing the first and second rotary levers 72, 73 about the pivot shafts 76, 77 as the center of rotation. By the first and second rotary levers 72, 73 being rotationally biased in the directions indicated by arrows B and C in FIG. 4, the first and second movement levers 59, 60 of the thrusting and supporting mechanism 58 are biased to be moved in a direction indicated by arrow D in FIG. 4.

On the front side of the base block 1 is mounted a lid 91 configured for opening or closing a cassette insertion/ejection aperture formed in an outer casing constituting a main body portion of the present recording/reproducing apparatus. The lid 91 has first and second supporting pieces 92, 93 protruded on both sides thereof and is mounted on the base block 1 by having a pivot shaft 94 protruded on the first supporting piece 92 introduced into a center opening 96 formed in a cylindrical portion 95 protuberantly formed on the distal end of the side plate 2 of the base block 1 and by having a pivot shaft 98 protuberantly formed on the lateral surface of the distal end of the opposite side plate 3 of the base block 1 inserted into a through-hole 97 formed in the second support piece 93. Thus the lid 91 is supported on the base block 1 for rotation about the pivot shafts 94, 98 as the center of rotation. Also the lid 91 is rotationally biased by a torsion coil spring 99 mounted on the cylindrical portion 95 in a direction of closing the cassette insertion/ejection aperture formed in the outer casing as indicated by arrow D in FIG. 4. That is, the torsion coil spring 99 rotationally biases the lid 91 about the pivot shafts 94, 98 as the center of rotation, in a direction as indicated by arrow E in FIG. 4, by being mounted on the cylindrical portion 95 by having one 99a of the arms thereof retained by a retention lug 100 protuberantly formed on a lateral surface of the side plate 2 and by having its opposite side arm 99b retained by the first supporting piece 92.

On the side of the lid 91 on which is protuberantly formed the first supporting piece 92, there is protuberantly mounted a rotary arm 101 adapted for being rotated by a movement actuation plate adapted in turn for being rotated by the holder supporting frame 40 as later explained. When the lid 91 is mounted on the base block 1, the rotary arm 101 is extended along the outer lateral surface of the side plate 2.

The lid 91 is provided with a see-through window 103 having a transparent plate 102. The see-through-window 103 permits the tape cassette 201 loaded on the cassette loading unit 9 to be seen from outside.

The loading/unloading of the tape cassette 201 loaded on the cassette holder 28 via the cassette inserting/ejecting aperture formed in the outer casing, with respect to the cassette loading unit 9, is done by moving the cassette holder 28 by a holder movement actuation mechanism 103.

The holder movement mechanism 103 shifts the cassette holder 28 by moving a movement actuation plate 104 by a driving motor 28. The movement actuation plate 104 is inserted into and supported by pivot shafts 108, 109 set on the outer lateral surface of the side plate 2 of the base block 1. Thus the movement actuation plate 104 is moved in the directions indicated by arrows F and G in FIG. 5 on the outer lateral surface of the side plate 2 within the range of the movement guide grooves 106, 107.

Figure 5:
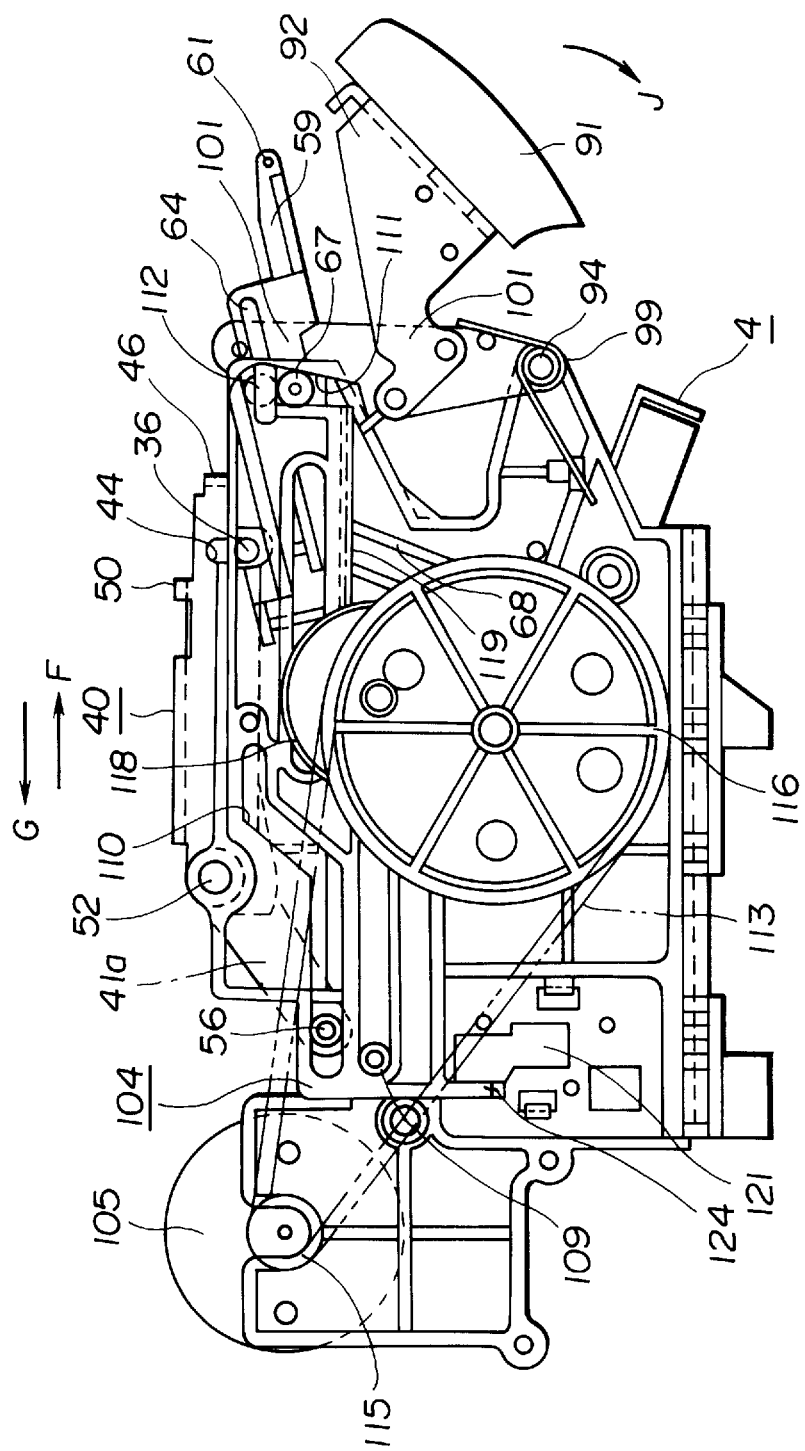
FIG. 5 is a side view of the magnetic tape recording/reproducing apparatus to which the cleaning device of the present invention is applied.

In the movement plate 104 is formed a first cam groove 110 having a cam surface 110 inclined along the movement direction. In this cam grove is engaged a first engagement pin 56 provided on the rotary arm 41a of the holder supporting frame 40, as shown in FIG. 5. On one side of the movement plate 104 is formed a vertically extending guide groove 111 opened on the lower edge and which is engaged by the engagement pin 67 provided on the first movement lever 59 of the thrusting supporting mechanism 58. On the side of the movement plate 104 is set upright a thrusting actuating pin 112 on which is abutted the rotation actuating arm 101 provided on the lid 91.

The driving motor 105, adapted for moving the movement actuating plate 104 movably mounted on the side plate 2, is mounted on the side plate 2 of the base block 1. The driving power of the driving motor 105 is transmitted via a connection belt 113 and a connection gearing 114 to the movement actuation plate 104. The connection gearing 114 is comprised of a connection gear 118 meshing with a gear 117 integrally formed with a follower pulley 116 on which is placed a connection belt 113 placed around a driving pulley 115 mounted on the driving shaft of the driving motor 105. The follower pulley 116 and the connection gear 118 are rotatably supported on pivot shafts 119, 120 set on the outer lateral surface of the side plate 2. The connection gear 118 has a small-diameter gear 118a and a large-diameter gear 118b formed coaxially therewith and interconnects the driving motor 105 with the movement actuation plate 104 by the large-diameter gear 118b being engaged with the gear 117 of the follower pulley 116 and by the small diameter gear 118b being engaged with a rack 119 formed on the lower edge of the movement actuation plate 104. Thus the movement actuation plate 104 is moved by being driven by the driving motor 105 in the directions shown by arrows E and F in FIG. 5 depending on the direction of rotation of the driving motor 105.

On both ends of the lower side edges of the movement actuation plate 104 are protuberantly formed first and second thrusting pieces 123, 124 adapted for thrusting first and second detection switches 121, 122 mounted on the side plate 2 of the base block for detecting the movement position of the movement actuation plate 104, as shown in FIG. 4. The first and second detection switches 121, 122 are thrust by the first and second thrusting pieces 123, 124 for detecting the movement position of the movement actuation plate 104 for controlling the driving of the driving motor 105.

Figure 6:
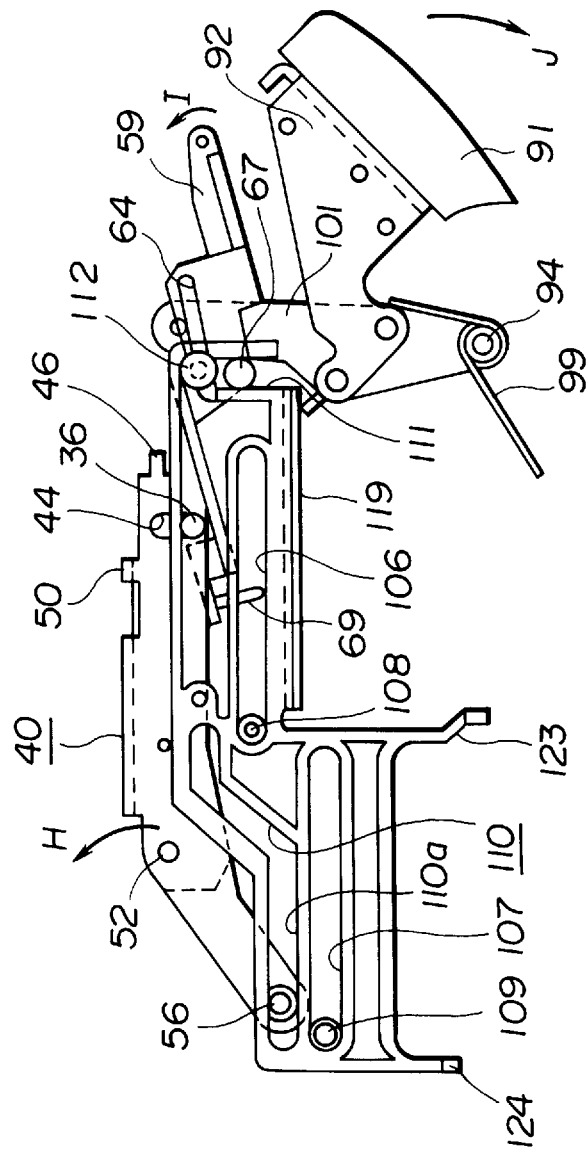
FIG. 6 is a side view showing the state of movement of a movement actuating plate when the recording/reproducing apparatus is in the state of ejection.

For loading the tape cassette 201 on the recording/reproducing apparatus fitted with the above-described cassette loading mechanism, the driving motor 105 is driven in reverse for moving the movement actuation plate 104 in a direction as indicated by arrow F in FIG. 5 for placing the movement actuation plate 104 at an ejection position enabling loading/unloading of the tape cassette 201 with respect to the cassette holder 28. When the movement actuation plate 104 is at the ejection position, the first thrusting piece 124 thrusts the second detection switch 122 for halting the driving of the driving motor 105. When the movement actuation plate 104 is at the ejection position, the first engagement pin 56, provided on the holder supporting frame 40, is positioned on the lower horizontal section 110a of the first cam groove 110 as shown in FIG. 6. The holder supporting frame 40 is rotated about the pivot shafts 52, 55 as the center of rotation as indicated by arrow H in FIG. 6, so as to be placed at a position spaced apart from the cartridge loading unit 9 provided on the supporting base plate 4.

When the movement actuating plate 104 is moved in a direction indicated by arrow F in FIG. 5, the thrusting and supporting mechanism 58, having the engagement pin 67 engaged in the vertical guide grove 111, is moved with movement of the movement actuation plate 104 in a direction as indicated by arrow A in FIG. 4, against the bias of the first and second tension springs 74, 75. When the movement actuation plate 104 is moved in a direction as indicated by arrow A in FIG. 4, the engagement pin 67 is moved to an upper position ahead of the cam groove 68 formed in the side plate 2 so that the first and second movement levers 59, 60 are rotated in a direction indicated by arrow I in FIG. 6 about the engagement pin 67 as the center of rotation.

The cassette holder 28, having its engagement pin 66 engaged in the first and second inclined cam grooves 64, 65 provided on the first and second movement levers 59, 60, respectively, is rotated with rotation of the first and second movement levers 59, 60 in a direction away from the cassette loading mechanism 9 about the pivot shafts 36, 37 as the center of rotation. The cassette holder 28 is further rotated relative to the thrusting and supporting mechanism 58 in a direction as indicated by arrow I in FIG. 6, until the connecting shaft 61 of the thrusting and supporting mechanism 58 is positioned below the cassette supporting plate 29 of the cassette holder 28. The aperture 31 of the cassette holder 28 is positioned at this time for facing the cassette insertion/ejection aperture formed in the outer casing.

When the movement actuation plate 104 is at the ejecting position, the rotation actuation arm 101 is thrust by the thrusting actuation pin 112 so that the lid 91 is turned against the bias of the torsion coil spring 99, in a direction as indicated by arrow J in FIGS. 5 and 6, for opening the cassette insertion/ejection aperture formed in the outer casing.

With the movement actuation plate 104 being moved to the ejecting position and, with the aperture formed in the cassette holder 28 facing the cassette insertion/ejection aperture formed in the outer casing, the tape cassette 201 is loaded on the cassette holder 28. The tape cassette 201 is inserted into the cassette holder 28 via the cassette inserting/ejecting aperture with the front side carrying the lid 204 as the inserting side.

When the tape cassette 201 is loaded on the cassette holder 28, the unlock member 34 provided on the cassette supporting plate 29 is engaged with the unlock member intruding grooves 214.

Figure 7:
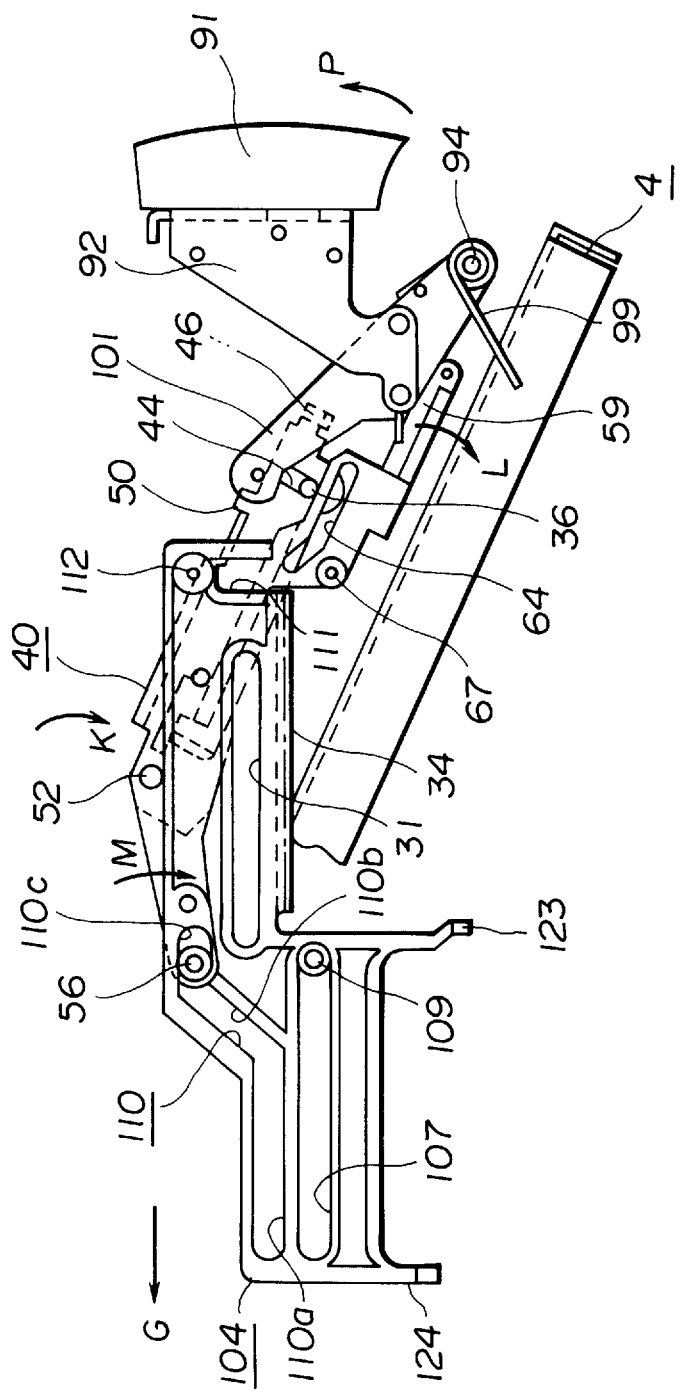
FIG. 7 is a side view of the recording/reproducing apparatus showing the state in which a tape cassette has been loaded on the cassette loading unit.

If, when the tape cassette 201 has been loaded on the cassette holder 28, the driving motor 105 is driven in a forward direction, the movement actuation plate 104 is moved in a direction as indicated by arrow G in FIGS. 5 and 7. When the movement actuation plate 104 starts to be moved, the thrusting supporting mechanism 58, having the engagement pin 67 engaged in the vertical guide groove 111, is moved in a direction as indicated by arrow D in FIG. 4. When the thrusting and supporting mechanism 58 is moved in a direction as indicated by arrow D in FIG. 4, the engagement pin 66 provided on the cassette holder 28 are moved to below the inclined cam grooves 64, 65 formed in the first and second inclined cam grooves 64, 65, so that the cassette holder 28 is turned in a direction opposite to the direction of arrow I in FIG. 6, with the connecting shaft 61 of the thrusting and supporting mechanism 58 being moved to a position facing the back side of the tape cassette 201 loaded on the cassette holder 28.

With movement of the thrusting and supporting mechanism 58 in a direction as indicated by arrow D in FIG. 4, the first and second rotary levers 72, 73 of the thrusting biasing mechanism 71 are turned in the directions as indicated by arrows B and C in FIG. 4 under the bias of the first and second tension springs 73, 74 for moving the first and second movement levers 59, 60 in the direction as indicated by arrows B and C in FIG. 4. When the first and second movement levers 59, 60 are moved in a direction as indicated by arrow D in FIG. 4, the connecting shaft 61 thrusts the back side of the tape cassette 201 loaded on the cassette holder 28. When the tape cassette 201 is thrust, the unlock members 34 provided on the cassette supporting plate 29 are intruded into the unlock member intruding openings 214 for thrusting the lock pawls 212 for unlocking the cover plate 203. The cassette main portion 202 is moved relative to the cover plate 203 retained by the retainer provided on the cassette holder 28 for opening the reel shaft inserting openings.

When the movement actuation plate 104 is further moved in a direction indicated by arrow G in FIGS. 5 and 7, the first and second movement levers 59, 60 of the thrusting and supporting mechanism 58 are turned in a direction of approaching to the cassette loading unit 9 as indicated by arrow L in FIG. 7 as it is moved in a direction as indicated by arrow D in FIG. 4. That is, the first and second movement levers 59, 60 are turned in a direction as indicated by arrow L in FIG. 7 as the engagement pin 67 is moved to a lower side of the second cam groove 68.

By the first and second movement levers 59, 60 being turned in a direction of approaching to the cassette loading unit 9, the cassette holder 28, having the engagement pins 66 engaged in the first and second inclined cam grooves 64, 65, is turned in a direction of approaching to the cassette loading unit 9, about the pivot shafts 36, 37 as the center of rotation.

When the movement actuating plate 104 being moved further in a direction as indicated by arrow G in FIGS. 5 and 7, the engagement pin 67 of the thrusting and supporting mechanism 58 is disengaged from the vertical guide plate 104, at the same time as the first engagement pin 56 provided on the holder support frame 40 rides on an upper horizontal section 110c from an inclined surface 110b of a cam groove 110. The holder support frame 40 is turned about the pivot shafts 52, 55 as the center of rotation in a direction of approaching to the cassette loading unit 9 of the first cam groove 110. The cassette holder 28 is turned about the pivot shafts 36, 37 as the center of rotation, under the bias of the coil springs 48, 49, to a position proximate and parallel to the cassette loading unit 9, as shown in FIG. 7.

When the cassette holder 28 is turned to a position proximate and parallel to the cassette loading unit 9, as shown in FIG. 7, the reel driving shafts 10, 11 are engaged via the through-holes 32, 33 and the opened reel shaft inserting openings with the hubs of the tape reels 207, 208 to complete the loading of the tape cassette 201 on the cassette loading unit 9. Since the cassette holder 28 is biased at this time towards the cassette loading unit 9, under the bias of the torsion coil springs 48, 49, the tape cassette 201 is perpetually pressured towards and supported by the cassette loading unit 9.

When the movement actuation plate 104 is moved in a direction as indicated by arrow G in FIG. 7, the pressuring of the rotation actuating arm 101 by the thrusting actuation pin 112 is released from the thrusting pressure by the thrusting actuation pin 112 and hence the lid 91 is turned in a direction shown by arrow P in FIG. 7 under the bias of the torsion coil spring 99 for closing the cassette inserting/ejecting aperture of the outer casing.

When the movement actuation plate 104 is moved as far as the cassette loading position of loading the tape cassette 201 on the cassette loading unit 9, the second thrusting piece 124 thrusts the second detection switch 122 for detecting completion of the loading of the tape cassette 201 to halt the operation of the driving motor 105.

Figure 8:
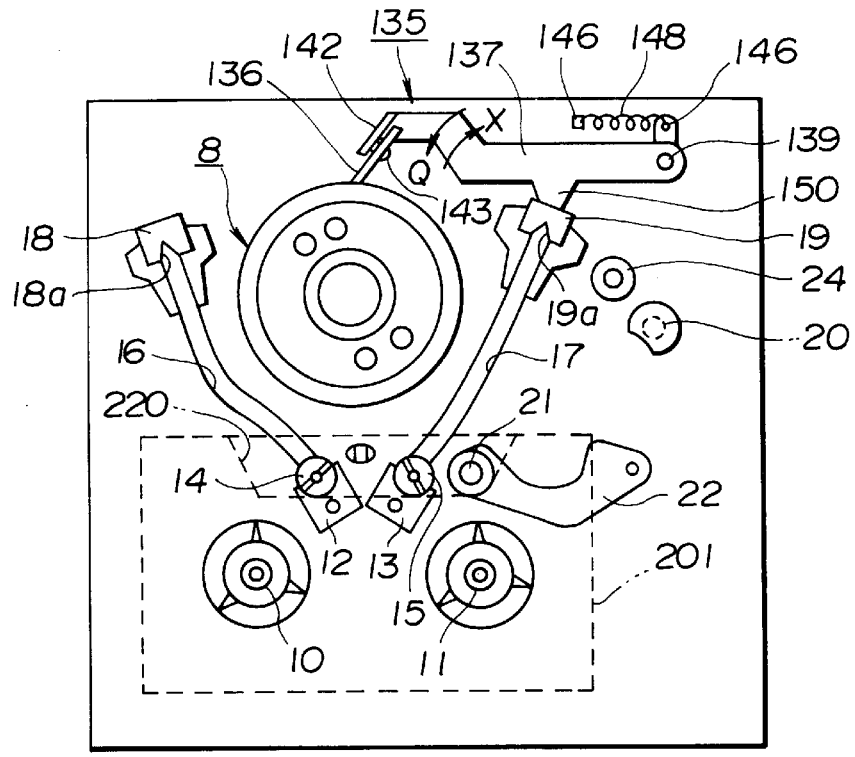
FIG. 8 is a plan view of the recording/reproducing apparatus showing the state in which the magnetic head is cleaned by the cleaning device according to the present invention.

When the tape cassette 201 has been loaded on the cassette loading unit 9, the tape guides 14, 15, pinch roll 21 and the movement tape guide 23, provided on the movement guide blocks 12, 13, face a loading recess 220 formed between the front side of the cassette main portion 202 and the lid 204, as shown in FIG. 8.

When the loading of the tape cassette 201 on the cassette lading unit 9 of the tape cassette 201 is detected by the second detection switch 122, a tape loading driving motor for actuating a tape loading mechanism, not shown, for pulling out the magnetic tape 209 from the tape cassette 201 and loading it on a pre-set tape travel path, starts its operation. When the operation of the driving motor for actuating the tape loading mechanism is started, the movement guide blocks 12, 13 are moved towards the rotary head unit 8 by being guided along the movement guide grooves 16, 17, at the same time as the rotary arm 22 carrying the pinch roll 21 and the movement tape guide 23 are moved to outside the tape cassette 201 from the position of facing the loading recess 220.

When the movement guide blocks 12, 13 are moved, the magnetic tape 209, extended on the front side of the tape cassette 201, is engaged by the tape guides 14, 15, pinch roll 21 and the movement tape guide 23 and pulled out to the pre-set tape running path. When the movement guide blocks 12, 13 are moved as far as both lateral sides of the rotary head unit 8 and engaged with the positioning portions 18a, 18b of the positioning blocks 18, 19, the magnetic tape 209 is placed around the outer peripheral surface of the tape guide drum 130 of the rotary head unit 8. The rotary head unit 8 at this time is in the rotation-actuated state.

After the magnetic tape 209 is placed around the magnetic head unit 8, the rotary arm 22 is rotated further and the pinch roll 21 is pressure-contacted with the capstan 20 which is being run in rotation for running the magnetic tape 209 at a constant speed. Thus the magnetic head of the rotary head unit is kept in sliding contact with the magnetic tape 209 for recording/reproducing information signals.

Figure 10:
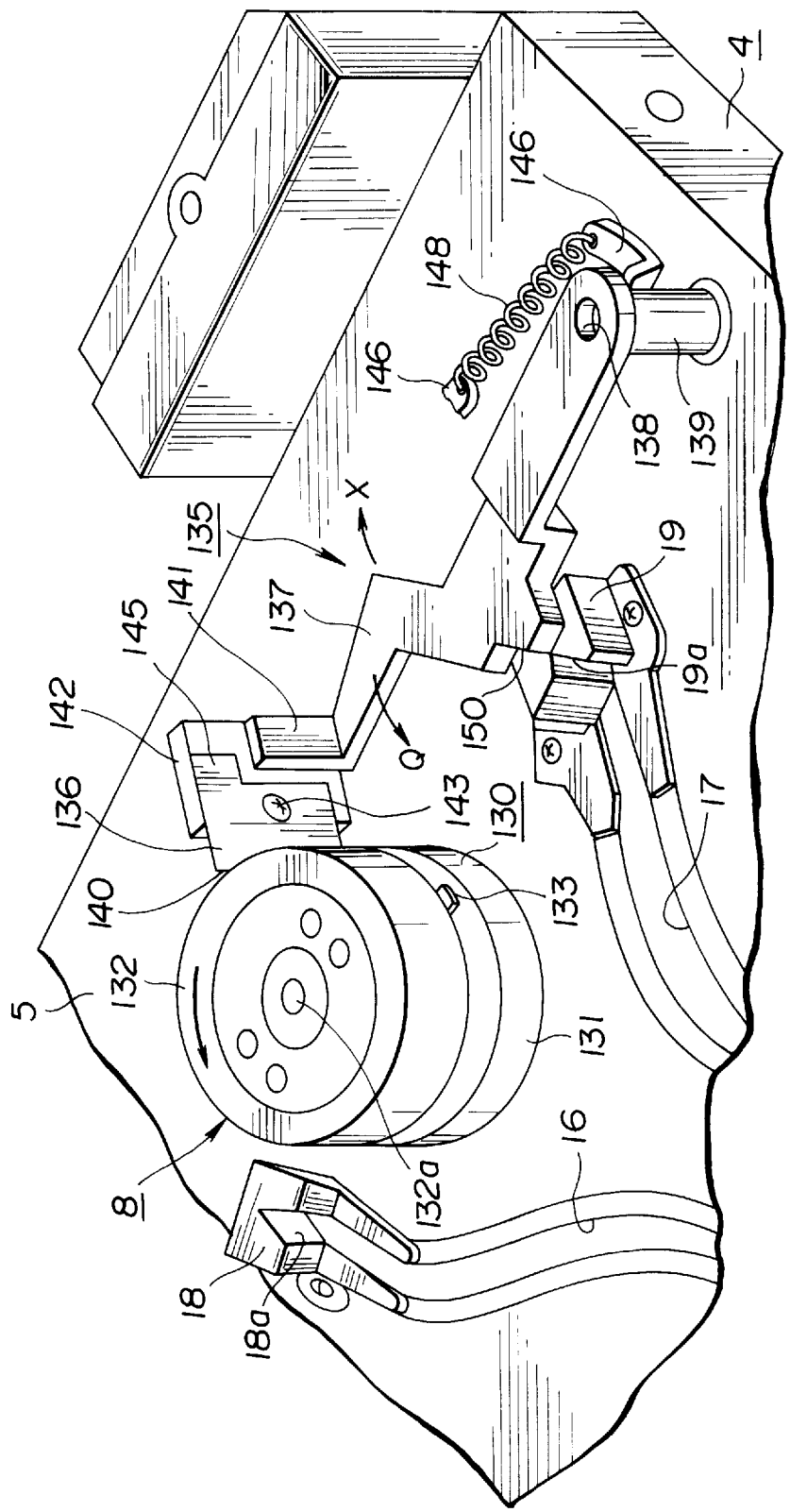
FIG. 10 is a perspective view showing the cleaning device according to the present invention and the rotary head unit cleaned by the cleaning device.

A tape guide drum 130, around which is placed the magnetic tape 209 of the rotary head unit 8 employed for a recording/reproducing apparatus according to the present invention, is made up of a stationary drum 131 secured to the supporting substrate 4 and a stationary drum 132 mounted coaxially as the stationary drum 131, as shown in FIG. 10. The stationary drum 131 and the rotary drum 132 are formed cylindrically from aluminum or the like metal in the form of cylinders of the same diameter.

A magnetic head 133 is mounted via the rotary drum 132. The magnetic head 133 is mounted on a surface of the rotary drum 132 facing the stationary drum 131 of the rotary drum 132 so that a distal part of the magnetic head having the magnetic gap is protruded slightly from the outer peripheral surface of the rotary drum 132. A plurality of magnetic heads 133 are mounted on the rotary drum 132.

Figure 9:
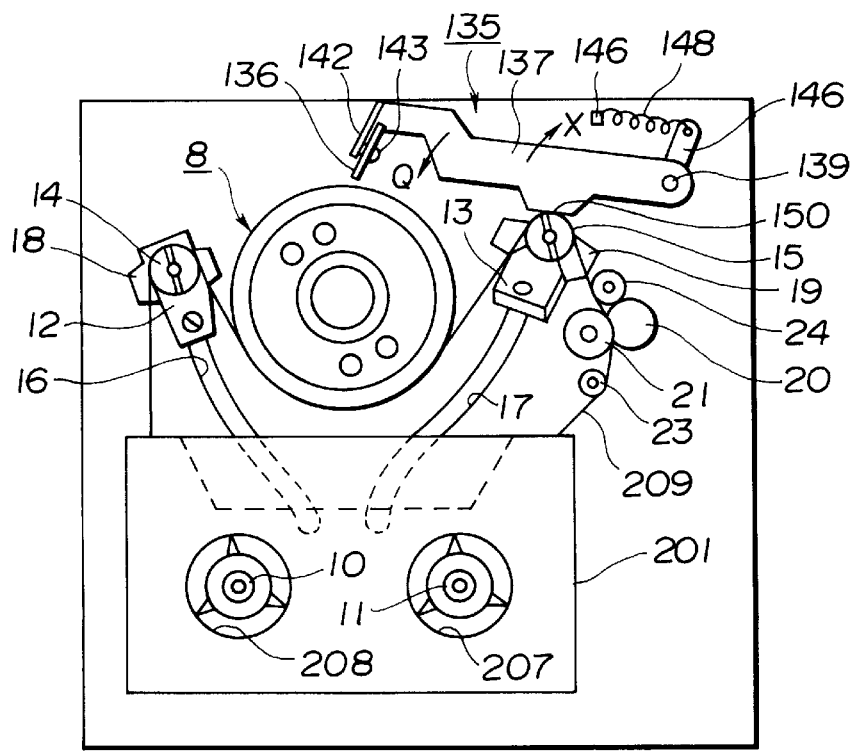
FIG. 9 is a plan view showing the state in which the magnetic tape has been loaded on the rotary head device and the cleaning member has been spaced apart from the rotary head unit.

On the supporting substrate 4 carrying the rotary head unit 8 is arranged a cleaning device 135 configured for cleaning the magnetic head 133 mounted on the rotary drum 132. This cleaning device 135 is arranged on the back surface of the magnetic head device 8 not carrying winding turns of the magnetic tape 209, as shown in FIG. 9.

The cleaning device 135 is made up of a cleaning member 136 adapted for having sliding contact with the magnetic head 133 mounted on the rotary drum 132 for cleaning the head 133 and a rotary arm 137 constituting an actuating mechanism for supporting the cleaning member 136 and for bringing the cleaning member into and out of contact with the tape guide drum 130, as shown in FIG. 10.

The rotary arm 137 is mounted for rotation about a pivot shaft 139 set upright on the supporting substrate 4 as the center of rotation by having the pivot shaft engaged in a through-hole 138 formed in the proximal portion of the rotary arm 137, the distal end of which faces the tape guide drum 130. The rotary arm 137 is rotated abut the pivot shaft 139 as the center of rotation for bringing the cleaning member 136 carried at the distal end thereof into and out of contact with the tape guide drum 130.

The cleaning member 136 is formed of a sheet material of high abrasion-resistant material. The synthetic resin material for the cleaning member 36 may be enumerated by polyethylene terephthalate (PET), polycarbonate (PC) and hard vinyl chloride. This cleaning member 136 is formed by punching a sheet material of synthetic material to a rectangular shape and is supported by the distal end of the rotary arm 137 so that a highly linear-worked edge 140 thereof adapted for having sliding contact with the drum faces the outer peripheral surface of the tape guide drum 130.

Figure 11:
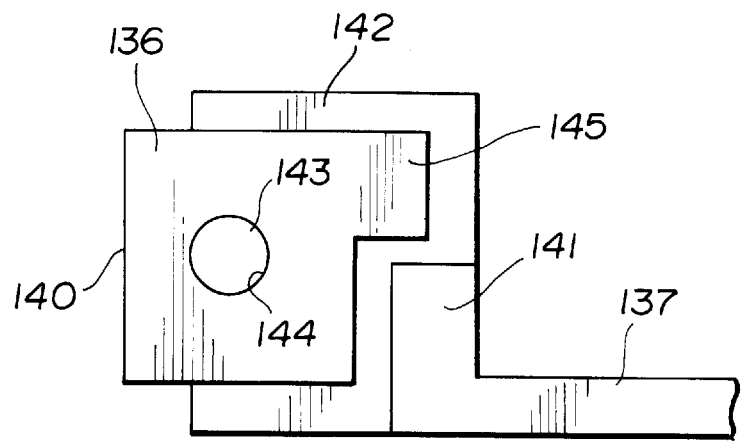
FIG. 11 is a side view showing the state in which a cleaning member has been mounted on a rotary arm and rotated.
Figure 12:
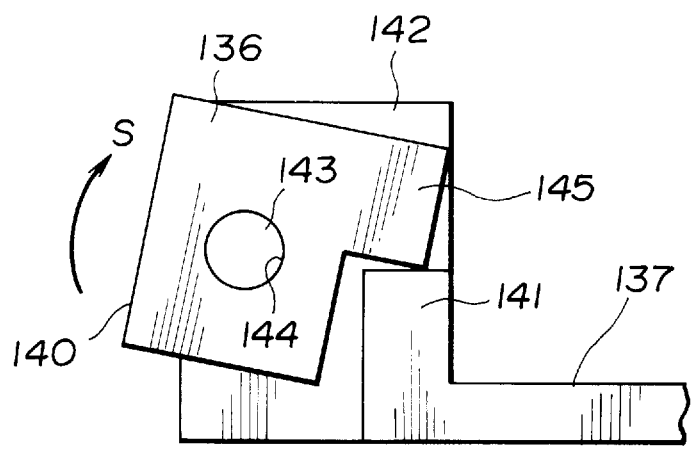
FIG. 12 is a side view showing the state in which the cleaning member has been mounted on a rotary arm and has been rotated.

The cleaning member 136 is supported in position by having a pivot shaft 143 engaged in a through-hole 144 formed at a mid portion of the cleaning member 136, as shown in FIGS. 10 and 11. The pivot shaft 143 is set upright on a supporting plate 142 mounted on a mounting piece 141 formed by warping the distal end portion of the rotary arm 137. The opposite edge of the cleaning member 136 opposite to the linear edge 140 of the cleaning member 136 is formed with a protrusion 145. By provision of this protrusion 145, the cleaning member 136 has its position offset from the center-of-gravity position towards the linear edge 140 supported by the pivot shaft 144 so as to be turned in a direction indicated by arrow S in FIG. 12 about the pivot shaft 144 as the center of rotation. The amount of rotational displacement of the cleaning member 136 is controlled by the protrusion 145 being abutted against the distal end of the mounting piece 141.

By provision of the protrusion 145, the mounting position of the cleaning member 136 on the supporting plate 142 may be discerned easily to prevent mounting in a mistaken orientation.

The rotary arm 137 is rotationally biased by a tension spring 148 installed between a spring retainer 146 protuberantly formed on one end of the proximal end thereof and another spring retainer 147 provided on the supporting substrate 4 in a direction of pressuring the cleaning member 136 supported at the distal end thereof against the outer peripheral surface of the tape guide drum 130 as indicated by arrow Q in FIG. 10. The tension spring 148 is selected to have a biasing force such that the linear sliding contact edge 140 of the cleaning member 136 is brought into pressure contact with the outer peripheral surface of the tape guided drum 130 with a pressure contact force of the order of 2 gf.

Figure 13:
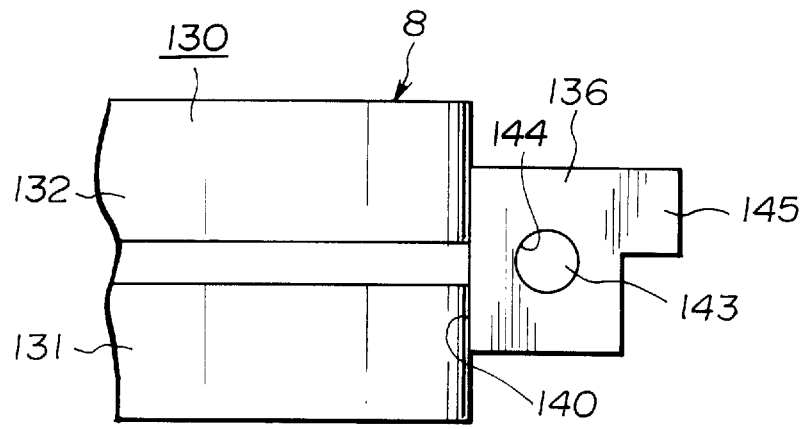
FIG. 13 is a side view showing the state in which the cleaning member has been caused to bear against the rotary head unit.
Figure 14:
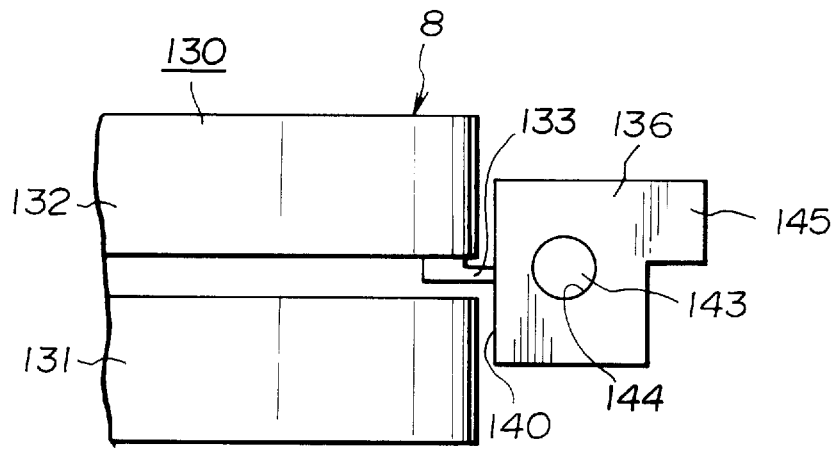
FIG. 14 is a side view showing the state in which a magnetic head is being leaned by a cleaning member.

Since the rotary arm 137 is rotationally biased by the tension spring 148, the cleaning member 136 is biased to be moved in a direction in which the sliding contact edge 140 is brought into pressure contact with the outer peripheral surface of the tape guide drum 130. When the cleaning member 136 is in pressure contact with the outer peripheral surface of the tape guide drum 130, the slide contact edge 140 of the cleaning member 135 extends parallel to a rotary shaft 132a of the rotary drum 132, as shown in FIG. 13.

On a side of a mid portion of the rotary arm 137 is protuberantly formed a thrust piece 150 thrust by the opposite side movement guide block 13 configured for loading the magnetic tape 209 on the tape running path. The thrust piece 150 is thrust by a portion of the movement guide block when the opposite side positioning block 13 is engaged with a positioning portion 19a of the positioning block 19 which has pulled out the magnetic tape 209 onto a pre-set tape running path. With the thrust piece 150 thus being thrust, the rotary arm 137 is turned against the bias of the tension spring 148 in a direction indicated by arrow X in FIG. 9 for displacing the cleaning member 135 carried at the distal end thereof away from the tape guide drum 130.

Thus, if the magnetic tape 209 is not loaded onto pre-set tape running path, the cleaning member 136 is abutted against the tape guide drum 130. Thus the magnetic head 133 can be cleaned by running the rotary head device 8 in rotation, with the magnetic tape 209 not being loaded on the pre-set tape running path.

Meanwhile, with the recording/reproducing apparatus employing the cleaning device according to the present invention, the rotary head device 8 starts its rotation when the loading of the tape cassette 201 on the cassette loading unit 9 has come to completion and the loading of the magnetic tape 209 housed within the tape cassette 209 to the tape running path has started. When the magnetic tape 209 has been pulled out to the pre-set tape running path for carrying out the loading operation of placing the tape around the tape guide drum 130, the thrust piece 150 is thrust by the opposite side movement guide block 19 so that the rotary arm 137 is turned against the bias of the tension spring 148 in a direction indicated by arrow X in FIG. 9 for displacing the cleaning member 136 carried at the distal end thereof away from the tape guide drum 130. Thus the rotary arm 137, biased into rotation by the tension spring 148, brings the cleaning member 136 into sliding contact with the outer peripheral surface of the tape guide drum 130 while the rotary drum 130 of the rotary head device 8 is rotated with the magnetic tape 209 not being as yet loaded about the rotary head device 8. By rotating the magnetic head 133 as one with the rotary drum 132 while the cleaning member 136 is kept in sliding contact with the tape guide drum 130, the cleaning member 135 can be brought into relative sliding contact with the magnetic head 133 for removing the magnetic powders or the like dust and dirt detached from the magnetic tape 209 and deposited on the distal end of the magnetic head 133.

Since the cleaning member 136 has a width extending from the rotary drum 132 as far as the stationary drum 131, with the magnetic head 133 as a mid point, it is possible to clean the peripheral surface of the lower edge of the rotary drum 132 carrying the magnetic head 133 as well, as shown in FIG. 13. On the peripheral surface of the lower edge of the rotary drum 132, magnetic powders detached from the magnetic tape 209 tend to be affixed as a result of sliding contact of the magnetic tape 133 with the magnetic tape 209. The region of the rotary drum 132 where the magnetic powders tend to become affixed also can be cleaned simultaneously.

Figure 15:
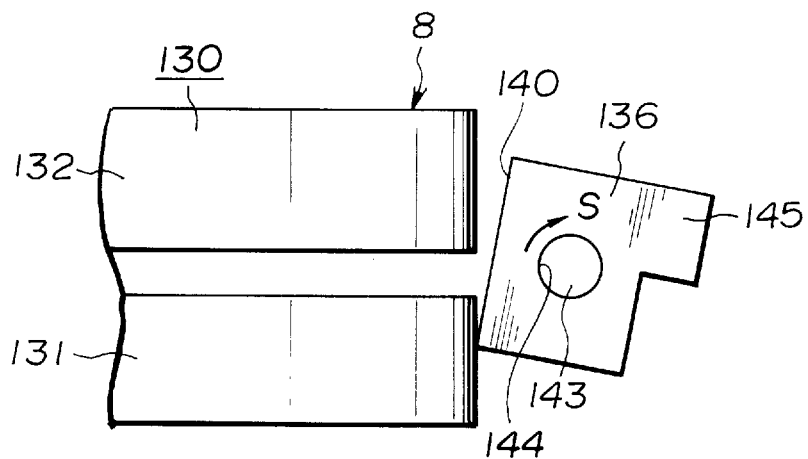
FIG. 15 is a perspective view showing the state in which the cleaning member has been spaced apart from the rotary head device.

The magnetic tape 209 is loaded about the rotary head device 8 and the rotary arm 137 is turned against the bias of the tension spring 148 in a direction indicted by arrow X in FIG. 9 so that the cleaning member 136 is displaced away from the outer peripheral surface. The cleaning member 136 is now turned in a direction of arrow S, with the pivot shaft 143 as the center of rotation, as shown in FIG. 15 so that the slide contact edge 140 thereof is displaced away from the rotary drum 132 and the magnetic head 133 and so that the corner of the lower end of the slide contact edge 140 is abutted against the stationary drum 131. Thus, during a prolonged period during which information signals are recorded and/or reproduced on the magnetic tape 209, the cleaning member 136 is controlled in connection with its having sliding contact with the magnetic head 133. The result is that excessive sliding contact of the cleaning member with the magnetic head 133 may be prevented for occurring to prevent the magnetic head 133 from becoming damaged.

With the recording/reproducing apparatus according to the present invention, if the magnetic tape 209 placed about the rotary head device 8 and pulled out on to the tape running path is returned into the inside of the tape cassette 201 by way of performing the unloading operation, the movement guide blocks 12, 13 are moved in a direction away from the positioning blocks 18, 19. By such movement of the movement guide blocks 12, 13, the rotary arm 137, thrust by the opposite side guide block 13, is turned in a direction of arrow Q in FIG. 8, under the bias of the tension spring 148, so that the cleaning member 136 is brought into pressure contact with the outer peripheral surface of the tape guide drum 130. When unloading the magnetic tape 209, the rotary drum 132 of the rotary head device 8 is the rotated state. That is, if the rotary drum 132 carrying the magnetic head 133 is halted while the magnetic tape 209 is placed therearound, the magnetic tape 209 is likely to undergo a large force of friction resulting in damage to the magnetic tape 209. For unloading the magnetic tape 209, the rotary drum 132 is in the rotating state at least during a period during which the magnetic tape 209 is displaced away from the rotary head device 8. The magnetic head 133 is cleaned by the cleaning member 136 having a sliding contact with the rotary drum 132 in the rotating state.

With the cleaning device 135 according to the present invention, the cleaning member 136 is in pressure contact with the outer peripheral surface of the rotary drum 132 if the magnetic tape 209 is not loaded on the rotary head device 8. Therefore, even when the magnetic tape 209 is spaced apart from the tape guide drum 130 and the magnetic tape 209 is in the halted mode, with the tape 209 not being in the running state, the magnetic head 133 can be cleaned by rotating the rotary head device 8.

Meanwhile, the magnetic head of the rotary head device used for a digital audio tape recorder as a tape recording and/or reproducing apparatus is of durability which is on the order of approximately 2,000 hours in terms of the recording and/or reproducing time of the audio signals. The tape cassette loading/unloading to the tape recorder is estimated to occur about 50,000 times during this durability time duration of the magnetic head. If the cassette loading/unloading occurs 50,000 times, the sum of the magnetic tape loading time and unloading time becomes approximately equal to 24 hours. The cleaning member was formed of polyethylene terephthalate (PET) and the cleaning member was brought into pressure contact with the rotary head device. In this state, the operation of cleaning the magnetic state was continued for 24 hours. It was found that the magnetic head was not worn in an amount exceeding that when the magnetic tape was in sliding contract with the magnetic tape for the same tine duration, while no damages were produced. There occurred no significant abrasion to the cleaning member which was in the state of continuing further cleaning of the magnetic head.

The cleaning device according to the present invention can be extensively applied to a magnetic head recording and/or reproducing apparatus employing a rotary head device. That is, it can be applied to a tape recorder for recording/reproducing audio signals. A video tape recorder for recording/reproducing video signals, a video tape recorder for recording and/or reproducing video signals and to a tape driving apparatus for recording and/or reproducing computer data.

Since the cleaning device for the magnetic tape recording and/or reproducing apparatus according to the present invention cleans the magnetic head in association with the operation of loading the magnetic tape on the magnetic head device, the magnetic head can be cleaned easily.

In particular, since the magnetic head is cleaned in association with the operation of loading the magnetic tape, the information signals can be recorded and/or reproduced with the magnetic head being perpetually kept in a clean state. By employing the recording and/or reproducing apparatus according to the present invention, the information signals can be recorded and/or reproduced with perpetually optimum recording and/or reproducing characteristics.

In addition, the magnetic tape can be protected since the magnetic head can be brought into sliding contact with the magnetic tape with the magnetic tape being perpetually kept in the cleaned state.

We claim:

1. A cleaning device for a recording and/or reproducing apparatus having an installation surface for mounting the cleaning device thereon and using a magnetic tape, comprising:

a rotary head device having a rotary drum attached to a magnetic head;

a supporting member pivotally mounted at a proximal end thereof on the installation surface for movement around an axis perpendicular to the installation surface;

a planar cleaning member having a straight edge formed to contact said rotary head device and pivotally mounted at a distal end of said supporting member for movement around an axis parallel to the installation surface; and actuating means connected to said supporting member for causing said planar cleaning member to press against said magnetic head when said rotary head device is rotating, thereby cleaning said magnetic head.

2. The cleaning device as claimed in claim 1, further comprising tape loading means for loading said magnetic tape on said rotary head device, and wherein said actuating means causes said planar cleaning member to press against said magnetic head of said rotary drum of said rotary head device when said rotary head device is rotating prior to loading said magnetic tape on said rotary head device by said tape loading means.

3. The cleaning device as claimed in claim 2, wherein when loading said magnetic tape on said rotary head device by said tape loading means, said actuating means releases said planar cleaning member from said magnetic head.

4. The cleaning device as claimed in claim 2, wherein said actuating means further includes:

a thrust portion formed on said supporting member for engaging with said tape loading means so that said planar cleaning member moves between a position in which said planar cleaning member is pressed against said magnetic head and a position in which said planar cleaning member is spaced apart from said magnetic head; and biasing means for producing a bias force for biasing said supporting member in a direction in which said planar cleaning member is pressed against said magnetic head.

5. The cleaning device as claimed in claim 4, wherein said supporting member is moved by said tape loading means against said bias force in a direction in which said planar cleaning member is spaced apart from said magnetic head during the loading operation on said rotary head device by said tape loading means.

6. The cleaning device as claimed in claim 4, wherein said planar cleaning member is pivotally mounted for rotation at a position offset from a center of gravity of said planar cleaning member, and wherein said distal end of said supporting member further includes a mounting portion for limiting the rotational movement of said planar cleaning member.

7. The cleaning device as claimed in claim 2, wherein said actuating means causes said cleaning member to press against said magnetic head when said rotary drum is rotating after unloading of said magnetic tape from said rotary head device by said tape loading means.

8. The cleaning device as claimed in claim 1, wherein said planar cleaning member is formed of polyethylene terephthalate.

* * * * *